Figures 1, 2:
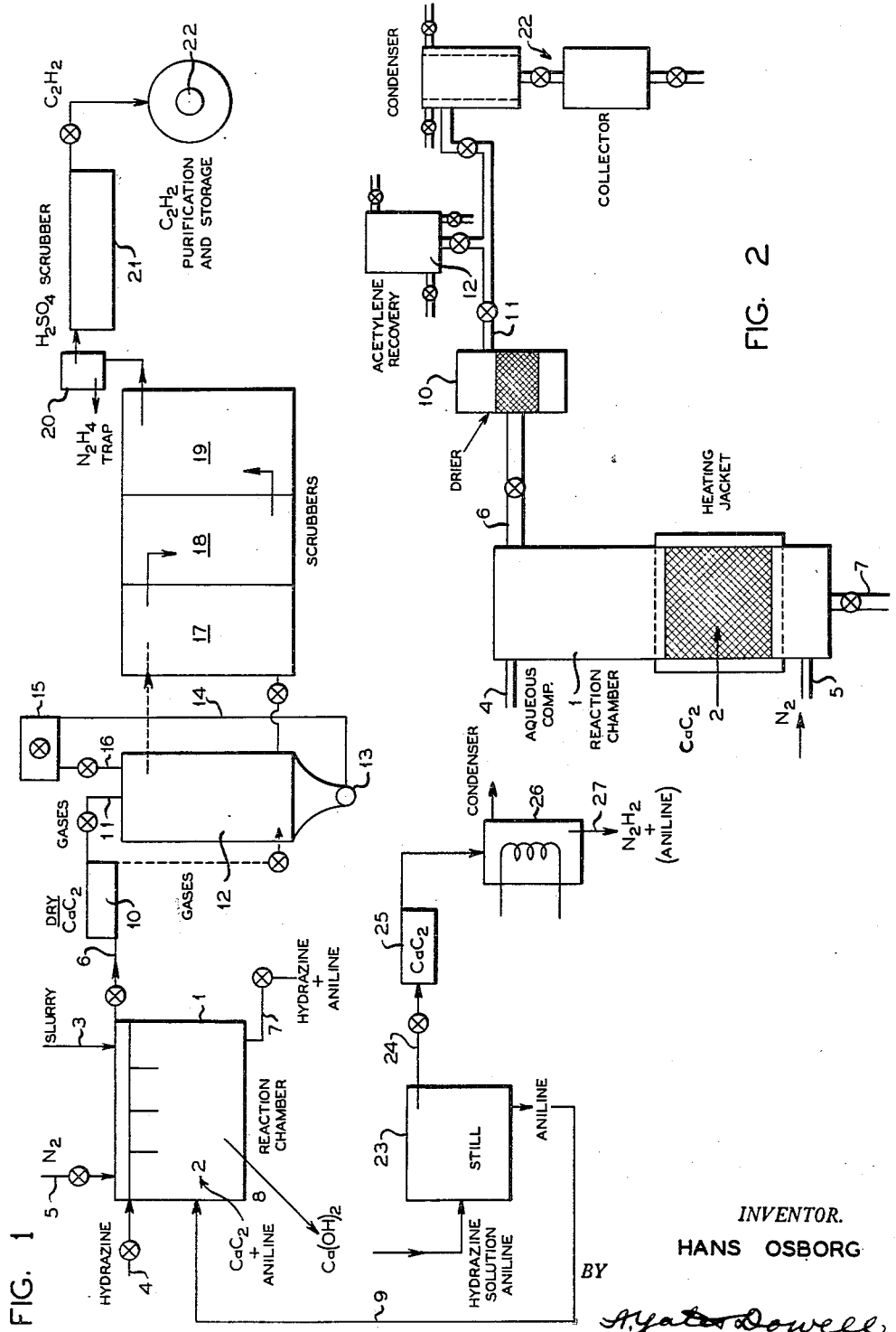

March 12, 1957 H. OSBORG 2,785,052
PRODUCTION OF HYDRAZINE
Filed June 22, 1951

INVENTOR.
HANS OSBORG
BY
A. Yates Dowell
ATTORNEY

United States Patent Office

2,785,052
Patented Mar. 12, 1957

2,785,052

PRODUCTION OF HYDRAZINE

Hans Osborg, Port Washington, N. Y., assignor to Metalectro Corporation, Bladensburg, Md., a corporation of Delaware Application June 22, 1951, Serial No. 233,046

18 Claims. (Cl. 23—190)

This invention relates to the production and recovery of hydrazine, either in substantially pure state or in the form of compounds thereof; to methods of producing and recovering hydrazine and its compounds; to apparatus for such processes; to the products themselves; as well as to agents instrumental in accomplishing the objectives.

The methods commercially employed in the production of hydrazine, as well as those described in the literature, comprise essentially two steps; in the first step, a solution of hydrazine is produced, and in the second step the hydrazine is recovered from such a solution. The hydrazine content in the solution of step one is usually within the range of 1% to 5% $N_2H_4$, and such solution is usually of an aqueous character. Usually, hydrazine is precipitated from such weak solutions in the form of a rather insoluble compound, such as hydrazine sulfate, $N_2H_4.H_2SO_4$, which is then treated with an alkaline compound in an aqueous solution in order to produce a more concentrated hydrazine solution. The removal or recovery of hydrazine from its solution is usually carried out in the second production step through repeated (fractional) distillation. In this manner, hydrazine hydrate (B. P. approximately 118° C.) is first produced which then, with the help of a strong caustic such as sodium hydroxide, is at still further elevated temperatures converted into the hydrazine base (B. P. approximately 113° C.) which is finally recovered through distillation. For the purposes of the present consideration, it is immaterial by what method the solution of hydrazine hydrate (step one above) has been obtained; in other words, this solution may be aqueous or not, it may result from the oxidation of ammonia or ammonia derivatives, or it may represent a hydrazine compound previously precipitated, such as hydrazine sulfate, and then converted into hydrazine hydrate through double decomposition of the hydrazine sulfate with caustic soda in a solvent such as water, or from any other procedure, method or process which yields hydrazine in solution. If any of such solutions of hydrazine or the compound hydrazine hydrate itself are subjected to step two of conventional present day procedure, they are not only affected by the shortcomings pointed out above, but furthermore do not readily yield a pure hydrazine base. As a rule, the commercially available hydrazine base manufactured in accordance with the prior art does not contain more than 90% to 95% of $N_2H_4$, the rest being composed of other (probably decomposition) compounds.

Both the removal of the excess water up to the point of producing hydrazine hydrate, a chemical compound of the formula $N_2H_5OH$, as well as the stripping of the chemically bound water from the hydrazine hydrate involve repeated cumbersome distillations resulting in additional losses of material. There exist also hazards, evidenced by the explosions which have heretofore occurred in prior art operations. Owing to the fact that present methods operate above the boiling point of hydrazine and of hydrazine hydrate for extended periods of time, and maintain a large portion of these products in their vapor phase throughout, danger of explosions accompanies conventional practice all the way. In order to minimize this, nitrogen is often employed to sweep the equipment and apparatus before and after as well as sometimes during the operation of the second step described above.

To summarize, the prior art [1] employs in its second step: (a) a purely physical process of separation in order to remove by means of fractional distillation excess water until a chemical compound, hydrazine hydrate, $N_2H_5OH$ is obtained; (b) this chemical compound is then subjected to a chemical treatment with sodium hydroxide or its equivalent at elevated temperatures further exceeding the boiling point of hydrazine, as well as that of hydrazine hydrate (which are approximately 113° C. and approximately 118° C., respectively) in order to remove forcefully by chemical means one mole of chemically bound water from each mole of hydrazine hydrate. Even with the supply of this amount of chemical energy coupled with much external heat, no greater purity than 95% has been obtained in regular commercial production.

It is well known that hydrazine tends to explode with great violence if its vapors come in contact with oxidizing agents, even with air, at temperatures exceeding about 50° C. This latent hazard becomes magnified and intensified if a minus pressure develops in the hot equipment which is a natural tendency if the conventional procedure of step two described above is applied.

In order to overcome the formation of a minus pressure in the equipment, the prior art often employs the above described sweeping with nitrogen, which is also intended to prevent the occurrence of a minus pressure.

In view of the comparatively high vapor pressure of hydrazine, even at room temperature, the liberal sweeping of the superheated equipment with nitrogen necessitates very strong cooling of the vapors resulting from distillation in order to minimize losses and additional hazards from escaping vapors.

In the manufacture of hydrazine base, the distillation of the dilute hydrazine solution to the point of obtaining hydrazine hydrate, and then the removal of the chemically bound water from the hydrazine hydrate to produce hydrazine base is uneconomical as well as unsafe, and a more elegant method is desirable in the interest of safety and economy.

Among the objects of the present invention is the production or recovery of hydrazine in high yields by economical methods which greatly reduce the cost of such products.

Other objects include such products in any desired concentration including products substantially 100% pure.

Further objects include improved and novel methods of producing acetylene.

Still further objects include novel commercial products.

Additional objects include the methods and apparatus for practicing the invention.

Still further objects and advantages of the present invention will appear from the more detailed description set forth below, it being understood that such more detailed description is given by way of illustration and explanation and not by way of limitation since various changes therein may be made by those skilled in the art without departing from the scope and spirit of the present invention.

---
[1] There are also other methods disclosed in the prior art besides the one here discussed but this one has so far been the most widely used.

In connection with that more detailed description, there is shown in the accompanying drawing, in Figure 1, a schematic arrangement of apparatus useful in carrying out the present invention, and in Figure 2, a section through a modified form of acetylene trap.

In accordance with the present invention, hydrazine or its hydrate are produced and recovered from compositions of hydrazine containing water in one form or another which compositions include solutions, suspensions and dispersions, by treatment with calcium carbide. The latter reacts with such compositions to free the desired hydrazine or its compound and to yield a composition from which hydrazine or the desired compound can be recovered as desired, in any concentration sought or in the form of a substantially pure compound. Mere contact of such composition with the calcium carbide will produce the desired reaction and product but for industrial exploitation, careful control of the conditions of contact and reaction, and of the conditions of recovery are essential.

The hydrazine or its compound may be present in any desired concentration and in a variety of forms. Aqueous solutions of hydrazine as commonly produced in any of the ways set forth above as by oxidation of ammonium or ammonia derivatives even though rather dilute such as 1% to 3% may be used in the present process, or any other concentration such as 10%, 20%, 30%, 40%, and higher up to 100% may be economically treated by the present invention. Or the hydrazine may be in the form of its hydrate, $N_2H_4 \cdot H_2O$ or $N_2H_5OH$. In all cases an aqueous composition may be used and the amount of water present may vary within wide limits. The type of method employed may in part depend on the hydrazine material undergoing treatment. By using hydrate or hydroxide, conversion can be obtained in a single step with 100% purity and yield at relatively low temperatures.

The calcium carbide may be in any desired form such as powder, pea-size, lump, ingots, etc. The lump or pea size particles, or even somewhat smaller than pea size now available commercially may be desirably used for batch operations. The conditions of reaction may in part affect the condition of calcium carbide used.

Best known among the industrially employed methods for the manufacture of acetylene are the so-called wet and the so-called dry method. The terms "wet" method and "dry" method are like the industrially employed methods for the manufacture of acetylene. The wet method operates with an excess of water, produces a wet acetylene gas, and gives a residue which is a wet slurry of hydrated lime and constitutes an increasing nuisance to the manufacturer as well as to the local authorities. For the purpose of recovery of hydrazine from its solutions or hydrate, the wet acetylene method can be used, the principal difference between this and the above-described method being that no pure hydrazine can be obtained, but a mixture of hydrazine and hydrazine hydrate, or even only hydrazine hydrate itself. The shortcoming of the wet method, as far as hydrazine recovery is concerned, lies in the fact that in order to recover enough of the hydrazine from the slurry, the slurry itself requires additional heating to temperatures above 120° C., which in turn increases the expense and also drives much of the water back into the hydrazine or hydrazine hydrate previously distilled over.

In the dry method, water in limited but controlled amounts is used and its addition to the calcium carbide is so regulated that calcium hydroxide residue is produced directly in a substantially dry powder form. The efficiency of the so-called dry method for the manufacture of acetylene is in part offset by latent hazards and shortcomings which are well recognized in the acetylene industry although, generally speaking, are usually kept fairly well under control but which all relate to the delicate behavior of acetylene at higher temperatures.

Instead of using the calcium carbide in dry form, it may be mixed in powder form or larger particle size with a carrier liquid inert at the temperatures and pressures employed to the reactants such as calcium carbide and to the products formed such as acetylene, to produce a solution, suspension or slurry which may be used in lieu of the dry calcium carbide, and the hydrazine composition, containing water in one form or another, added thereto in any manner. The inert liquid thus provides more uniform contact, and does so over a larger surface area, between such hydrazine composition and calcium carbide, and also better heat transfer throughout the reacting mass, thus preventing hot spots and delayed reactions while at the same time increasing both velocity and intensity of the reaction.

Another method of utilizing advantageously the inert liquid carrying the water-containing compound (or just water) consists in charging a tube, kettle, reaction chamber, or the like, with larger particles of calcium carbide, or large lumps, or even ingots of any size (preferred 1 to 2 feet diameter or square, by a few or several feet long), and then passing the stream of liquid through such vessel containing calcium carbide lumps or ingots. In this manner the generation of acetylene can be closely regulated, and although this can be carried out up to high velocity, the temperatures of reaction, of the reactants and of the equipment can be kept much lower than in any conventional process of generating acetylene. At the same time, the calcium hydroxide formed and the impurities of the calcium carbide ingot or lumps are washed away so that said ingots or the like present continuously a clean smooth surface in the state of highest reactivity. The liquid with solids, or slurry, leaving the reaction chamber flows into settling tanks which are connected to the acetylene manifold system to remove gases generated from unreacted particles washed away from the reaction chamber. The carrier liquid can be used over and over as long as the water contained therein, or present as bound water, is properly replaced as or when it is consumed in the reaction.

In another application of the carrier liquid principle, freshly crushed high grade particles, including fines, or even low grade calcium carbide dust or waste can be advantageously used. In this case the slurry is circulated, spent carrier liquid continuously brought up to desired water content, and the fluffy lime powder withdrawn as necessary for final separation of lime and liquid.

In addition to having a very efficient method of built-in heat exchange, all carrier liquids of amine or basic character supply simultaneously a refining system during the reaction period (and not afterwards) which effectively, and economically removes impurities common in calcium carbide like hydrogen sulfide, phosphines, etc. The acetylene thus obtained is often in a sufficiently pure condition for further treatment or application. The presence of hydrazine increases the speed and efficiency of impurity removal beyond that possible by amines alone. This improvement becomes particularly accentuated if advantage is taken of the much lowered freezing point of hydrazine-amine systems and if the final washing is performed at temperatures below, or even much below, room temperature under which conditions more of the impurities are removed, and more quickly.

For the separation of impurities from amine or amine-hydrazine mixtures conventional treatments can be employed, such as heat and variation in pressure, or solvent extraction. It has been found, however, that strong alkali, such as NaOH or NaOH with some water, or alcoholic caustic make this purification much more efficient and serve to support higher yields of hydrazine recovery from these washing solutions together with effective regeneration of the amine.

It has further been observed that the amount of impurities retained in the carrier liquid rises as the reaction temperature is decreased. It is, therefore, possible to regulate and control the relative amounts of impurities as retained in the carrier liquid and in the washing towers during and after the reaction periods.

By its concentration, temperature and speed of passage through, or circulation, the inert liquid thus controls both intensity and capacity of the reaction, and the concentration, purity and state of the products resulting therefrom. After completion of the reaction, the hydrazine may be removed in any desired way, the inert liquid separated from the calcium hydroxide producing slaked lime of low moisture content, and the inert liquid recovered for reuse. Any inert liquid may be used in which the hydrazine or hydrazine compound is soluble or insoluble. Thus liquid amines, including aromatic amines like aniline, or aliphatic amines, including 2-ethyl hexylamine, or di-N-butylamine, or cyclohexylamine, aromatic hydrocarbons such as toluene and the xylenes, petroleum and its fractions such as kerosene, etc., or silicones which possess reasonable solubility for water, may be used. Desirably the inert liquid used has a boiling point substantially higher than that of the hydrazine or its compound so that the latter may be separated by distillation from the reaction zone. And the inert liquid may desirably have a solvent effect on the hydrazine. If preference seems to be given to higher boiling carrier liquids, nonetheless, lower boiling carrier liquids are not excluded which are perfectly suitable, particularly in the absence of hydrazine when they can contribute to the efficiency of heat exchange and safety.

Under certain circumstances, it is possible to use as a carrier liquid, substances which undergo reaction with the products present in the reaction chamber. If these reactions can be controlled, additional advantages can be gained. Then in case of alcohols or alcohol amines, calcium salts are formed from which calcium hydroxide can be precipitated out through the addition of controlled amounts of water. However, certain compounds such as alcohols and their derivatives like glycols or aminoalcohols particularly alkylolamines such as mono-ethanol-, diethanol-, or triethanolamines, as well as certain amines, are considered practical for the purpose, particularly those which form hydrates and whose boiling point is sufficiently above the operating temperature employed in the reaction chamber or, even better, above that of water or, still more satisfactory, high enough above that of hydrazine to permit of clear-cut separation by means of fractional distillation. Diethanolamine dissolves water in all proportions, but forms first a hydrate which does not react readily. However, every drop of water beyond the hydrate stage becomes available for the present process, at room or lower temperature. Inasmuch as (a) much more than 5% water (free water) can be in solution (b) the presence of as little as 10% of diethanolamine in water slows the reaction of water-calcium carbide down to a very noticeable extent, the diethanolamine becomes a very useful and pliable tool for the purpose. The amines of this group have high boiling points (about 170° and 270° C., respectively), and are solvents for hydrazine, and are soluble in aniline. Therefore, combinations of aniline, ethanolamines and water offer perfect flexibility with respect to the amount of water held in solution, the reactivity and the desired heat exchange to keep the reaction chambers at their optimum temperature.

The use of an inert carrier liquid, may be desirably employed to minimize most of the hazards of the "dry" method of operating while retaining its advantage as further explained below.

The ratio of hydrazine or hydrazine compound in the composition, to the calcium carbide, may vary substantially. For recovery of the highest yields of more highly pure compound, the calcium carbide should be in excess of that required to react with the available water, to insure that no traces of bound water remain in the hydrazine. The calcium carbide may be in the form of a "dry" bed to which the other reactant is fed directly, or, via a carrier liquid. In the "wet" process, the depth and surface area of the bed is immaterial.

The temperatures in the reaction zone require no limitation other than that they should desirably be below the boiling point of hydrazine in order to avoid losses of the latter during the first stage of the reaction. In other words in general, the hydrazine or its compound is retained in the reaction zone where it is permitted to accumulate until its recovery is desired. On the other hand, the temperature can be allowed to rise sufficiently so that all of the hydrazine produced will leave the reaction zone or chamber simultaneously with the acetylene formed. This method has been found perfectly feasible as long as proper care is taken to recover the hydrazine vapors by condensing, or better, freezing out the hydrazine.

The reaction process may be carried out under any safe pressure desired. Normal atmospheric pressure may be used although preferably superatmospheric pressure—within the safety limits recognized for acetylene—is desirable because under minus conditions the possibility of explosion is invited in the event of a leak in the apparatus. However, insofar as the reaction itself is concerned, sub- or superatmospheric pressures can be used. In this connection, it is desirable to conduct the reaction of calcium carbide with the hydrazine composition in an inert atmosphere, as by sweeping nitrogen through the apparatus. Other inert gases or vapors may be used. Not only is a nonoxidizing atmosphere supplied in this way, but the current of inert gas may also serve the purpose of a carrier for gases or vapors formed, both during the initial reaction when acetylene is formed, and later when the hydrazine, or its compounds, are removed from the reaction zone particularly when distillation is used. It is preferred to sweep the apparatus only before and after the reaction, as the vapors of the inert or carrier liquid—entrained with the escaping acetylene gas—serve greatly to minimize the danger inherent in compounds like acetylene.

In the reaction zone, the composition containing hydrazine or hydrazine hydrate in solution, suspension or dispersion, is introduced to the zone or chamber containing the calcium carbide. Batch, semi-continuous, or continuous operations can be used. If multiple reactors are employed, the process can be made substantially continuous by having reactors in parallel, as well as in series, so that when one has reached a condition for recovery of hydrazine or hydrazine compound, it is cut out of the system and another reactor cut in. The rate of addition of the hydrazine composition may vary. If the addition is direct to the calcium carbide bed, and if the rate of addition is rapid, the process is carried on satisfactorily in the "wet," or in the slurry state. If, on the other hand, the rate of addition is slow, the process is carried on in a dry state.

The reaction is exothermic. If the temperature is permitted to build up, all of the hydrazine will not be retained in the reaction zone but some distills off and provision may be made for collecting it. Preferably the gaseous reaction products, principally acetylene, will pass through a dry chamber which is charged with a drying agent. This may be any material heretofore used, but here the chemically effective calcium carbide is desirably used. Any hydrazine which passes over from the reaction zone, and which has not been completely stripped of water will be brought to practically 100% purity in this chamber from where, if desired, it can generally be caught and removed. Or a low temperature trap (heat exchanger) may be utilized to catch the hydrazine. Less than 1% escapes ordinary traps but is recovered in a heat exchanger operating at a temperature lower than that of tap water. Lower temperatures enable more rapid distillations to be used. The acetylene may then be dried and passed into acetone in accordance with conventional methods, or collected in any other way.

In its presently preferred application, the solution of hydrazine is allowed to act on calcium carbide under controlled conditions with respect to temperature, speed of reaction and depth and surface area of the calcium carbide bed.

The heat required to drive over the hydrazine, $N_2H_4$, from the reaction bed to a suitable receptacle can be supplied externally while the system may be swept with an inert gas. Alternately, the heat required can be supplied by the reaction of the calcium carbide in the reaction chamber, so that external heat could be required only to make certain that all of the hydrazine has entered the drying towers. (The term "drying towers" is used for convenience; it is in fact a misnomer, as the residual water or moisture content is reacting to decompose the calcium carbide in exactly the same manner as it does in the reaction chamber.) Furthermore, external heat still may have to be supplied to drive the hydrazine through and out of the "drying" towers. As a further alternative, acetylene originating from calcium carbide-water reaction can be used to sweep the system and to carry the hydrazine to and through the "drying" towers if the calcium carbide reaction, with available water, is conducted in a manner commonly referred to by the art as "dray generation."

The condensation and recovery of hydrazine is accomplished through proper heat exchangers, condensers, and coolers which take advantage of the high melting point of hydrazine ($+2°$ C.), making it possible to freeze out hydrazine and its vapors at ice, or better, Dry Ice, temperatures, while the acetylene, with its considerably lower melting as well as boiling points, is collected at the end of the system in the customary way. Alternately, hydrazine can be condensed in a suitable solvent.

Modifications in the method will be governed by economic considerations, so that a proper ratio of hydrazine liberated to acetylene generated will be maintained particularly as the efficiency of heat exchange or cooling systems is concerned. If desired, it is possible to subject dilute hydrazine liquors to an initial precipitation as sulphate, convert the sulphate into higher hydrazine concentration, and apply this more concentrated liquor to the new process. Also, dilute aqueous solutions of hydrazine, if used in the present process, could dispense with the cooling system, substituting concentrated sulphuric to trap the hydrazine out of the gas or vapor stream. The resulting hydrazine sulphate could then be converted as usual, and the aqueous solution resulting therefrom would be applied to the acetylene process with suitable heat exchangers and cooling systems attached to recover all the hydrazine. Instead of using aqueous or caustic solutions, or any other solutions of hydrazine, compounds of hydrazine and carbonic acid or its anhydride or solutions thereof can be employed, resulting in the direct formation of calcium carbonate simultaneously with the liberation of hydrazine and generation of acetylene. In a similar manner, other soluble salts of hydrazine can be utilized in the present process.

The products obtained may be controlled as desired. When hydrazine is sought, it may be produced as a solution or suspension of any desired concentration or in 100% pure form containing no water or other impurities. Or, the reaction may be stopped at a stage to give hydrazine hydrate which may be recovered as such. This was carried out many times with variations which included aqueous hydrazine additions, hydrazine-hydrazine hydrate additions, or just additions of water.

To illustrate the use of a carrier liquid in the dry method of operation, the process may be as follows: calcium carbide of desired particle size may be worked up to a slurry with aniline in a reaction chamber. This reaction chamber is desirably provided with a stirrer of variable speed, and with a nitrogen feed line to sweep the equipment before and after each run. At the same time the reaction chamber is desirably connected with a flowmeter, pressure gauge and other control instruments. The chamber is connected directly to a condenser, or, alternately, with a tube charged with calcium carbide which then is connected to a condenser. In front of the condenser, and in the stream of the vapors passing by at that point, a thermometer may be placed. A second thermometer may be connected through a separate well to measure the temperature of the slurry directly, while a third thermometer measures the temperature of the vapor phase within the reaction chamber. Another suitable attachment was made providing for metered feeding of the liquid which was to react with the calcium carbide in the slurry.

The condenser may be first cooled with tap water, but to increase the velocity of the reaction and the speed and volume of the acetylene generated, the coolant in the condenser is desirably a refrigerant operating at lower temperatures than tap water. Following the condenser there may be a receptacle kept at a temperature appreciably below 0° C. which in turn is followed by a still colder condenser kept at temperatures from about $-20°$ C. to about $-180°$ C., or even lower, in order to trap all the entrained material carried by the swiftly moving acetylene. At the end of the train, gas wash bottles, including some charged with 50–50 sulfuric acid or with caustic, as well as standard gas meters, are desirably installed.

Measured amounts of known concentrations of hydrazine solutions were metered at varying speeds into the reaction vessel. The charge in the reaction vessel was continuously agitated at controlled speeds (the amount of circulation is directly proportional to the amount of $C_2H_2$ generated per given amount of reactive water present), and its temperature was so regulated, for instance by means of outside cooling, that it never exceeded much 50° C., but it was preferably kept at room temperatures or even much below.

After the entire system had been carefully swept with nitrogen, the hydrazine solution is admitted to the reaction vessel in the above-indicated manner and practically immediately the reaction starts. About 50–60% of the amount of acetylene, corresponding to the reactive water content admitted, is liberated instantaneously and removed from the system. After the desired amount of hydrazine solution has been metered into the reaction chamber, it requires for the pea size calcium carbide chosen approximately 2 to 3 times as long, depending upon temperature and stirring conditions, to generate the balance of the acetylene which corresponds to the amount of reactive water present.

It is important to note that about 50% to 60% of the acetylene corresponding to the quantity of reactive water admitted are liberated instantaneously without substantial increase above the operating temperature. It has also been determined that the 40% to 50% of reactive water still present and unreacted at the time the feeding was completed will yield its corresponding amount of acetylene just as instantaneously as the first portion if the particle size of calcium carbide is sufficiently decreased. In other words, applying this observation to industrial operations, several reaction chambers in series are required, each one containing $CaC_2$ of a definite but successively decreasing particle size. The aniline solution of hydrazine, hydrazine hydrate, and/or water is then transferred from the first reaction chamber (which has the coarsest calcium carbide size) into the next reaction chamber (which has a smaller particle size), and from there on to the next as soon as the acetylene generation has passed its maximum in each chamber, and until the finest particle size necessary has exhausted all the available reactive water content. It is, therefore, an advantage to conduct this process on a continuous basis instead of as a batch operation.

After the free or chemically bound, but reactive, or available, water content which has been added during the operation to the aniline has been exhausted, the aniline is subjected to heat. This heating can be carried on in the same reaction chamber which is used in batch operations. In the case of continuous operations, the hydrazine-containing aniline can be drawn off and heated separately. As the heat applied to the aniline hydrazine solution increases to the boiling point of hydrazine, the hydrazine begins to distill over in the same manner as is the case in other fractional distillations. Here again it is optional to add into the distilling column a chamber with calcium carbide lumps depending on whether or not it is desired to obtain hydrazine of 100% purity.

Owing to the relatively high vapor pressure of aniline itself, and in spite of the fact that aniline has a boiling point of about 180° C., which is about 70° C. above that of hydrazine, a certain amount of aniline vaporizes under the temperature and pressure conditions existent and rides, so to speak, with the hydrazine vapor molecules through the condensing system into the receptacles where, depending upon operating conditions, a solution of aniline in hydrazine collects, ranging from 60% to 95% or better hydrazine, the balance aniline. This phenomenon is regarded as highly desirable under the circumstances because it minimizes the hazards connected with distilling hydrazine. As already pointed out before, the presence of aniline raises the flash point for hydrazine to a noticeable extent; in other words, makes the handling of hot hydrazine so much safer.

It has been discovered in the course of the work described herein, relating to the present invention, that hydrazine vapors show less tendency to burst into flame or explode instantaneously when exposed to oxidizing agents, including air, and that they can be more effectively recovered if these hydrazine vapors are accompanied by vapors of such materials in which hydrazine is soluble, and which themselves do not show the tendency to explode spontaneously when exposed to air at temperatures above 50° C., especially if the accompanying vapors represent materials having boiling points about 50° C., or more, above that of hydrazine. Typical examples of the foregoing are found in the use of aniline and of ethanolamines as solvents and accompanying vapors.

Quantitatively speaking, 90% to 95% of the hydrazine fed into the system may be recovered in the end of each run, while the balance of the hydrazine is left in the reaction chamber for the next run. However, the distillation time may be extended and then yields from 95% to 98% or even better realized without difficulty.

The separation of the aniline from the aniline-containing hydrazine can be carried out quite conveniently by adjusting the length of the column in fractional distillations, and hydrazine of 99% plus purity, the balance aniline, is obtained. For some of the purposes for which hydrazine is used, it is an advantage to employ an aniline-containing hydrazine solution or a solution of hydrazine in a solvent including amines, alcohols, aminoalcohols, imines, etc. Many of the reactions for which hydrazine is utilized can be conveniently carried out in solutions of aniline or in solutions in which aniline can be tolerated. Such hydrazine solutions of aniline are therefore commercial products.

After the calcium carbide charged to the reaction chamber becomes exhausted, the residue consists of a powdered or fluffy material which may be separated from the aniline by simple filtration, and if necessary, subsequent pressing. Upon further purification of the residue with solvents or direct application of heat and/or vacuum, this residue consists of calcium hydroxide which is practically dry.

The aniline or other carrier liquid employed in this process may be used over and over and losses experienced have not been excessive. Calculations as well as tests have shown that the new "dry-liquid" method, if employed on a continuous scale and in a closed system, can hold losses to such a small percentage so that their cost will not be prohibitive.

Instead of aniline, basically any particularly organic liquid can be used for the above purpose as long as it does not react in an undesirable way with calcium carbide, with acetylene and/or with hydrazine under the operating conditions chosen. It is desirable that the liquid which for purposes of identification may be termed the "carrier-liquid" has some capacity to dissolve water. However, emulsions of mineral oils with water in the presence of alkali or lime have been used with good success although it is felt that on a large scale it would be more desirable to employ a carrier liquid which dissolves water. Aniline dissolves about 5% of water at room temperature. In view of the fact that aniline dissolves as much as one mole of hydrazine hydrate, $N_2H_5OH$, per mole of aniline, it is particularly useful for the present purpose. Last but not least, aniline and hydrazine base, $N_2H_4$, mix in practically all proportions and aniline is therefore a desirable agent to retain the hydrazine recovered until it is desired to separate the hydrazine from the aniline.

Technically speaking, there is of course a certain though small amount of hydrazine which escapes in vapor form with the acetylene gas and must be trapped in the condensing system before the acetylene is passed on to the acetylene treatment and storage plant.

Instead of aniline, aromatic hydrocarbons, or aliphatic hydrocarbons can be used, but their capacity to dissolve hydrazine solutions, or water, or to retain the hydrazine base, is in most instances so low that they cannot compete in this application with the advantages which aniline offers.

One of the essential features of this process is agitation in the reaction chamber. On a small scale, this agitation is best supplied by stirring, while on a larger scale, as in pilot plant operations, or particularly for full size plant operations, recycling through pumping (with or without gravity feed) is given preference over agitation by stirring.

The foregoing methods make it possible for the first time in the art to obtain 100% pure hydrazine from its solution in one simple step. By the same token, this method has been used with the same efficiency in the dehydration, or removal of chemically bound water, of the chemical compound hydrazine hydrate, $N_2H_5OH$, itself. Some of this material which was treated contained about 50 to 56% $N_2H_4$, balance water to make up the compound $N_2H_5OH$ (theoretically containing approximately 64% $N_2H_4$), and several percent of impurities such as iron, and a little dust and dirt. In every case, the application of the methods described herein yielded practically 100% of an essentially 100% pure hydrazine base, $N_2H_4$, and many gallons of this material have thus been successfully treated. In some other instances so-called pure hydrazine base purchased in the market was treated. These samples assayed between 92 and 95% of $N_2H_4$ content. Upon subjecting these trade samples to the method, or to one of its modifications, as described herein, a practically 100% pure product was obtained, and the losses in the recovery of the product were negligible.

The successful operation of hydrazine recovery on the basis of the above new process, and its modifications, particularly that relating to the "dry-liquid" method employing a carrier liquid which is inert towards calcium carbide under the operating conditions, suggests the use of this method for the production of acetylene itself, using water along as the addition agent. Here again, aniline was the first carrier liquid employed as it has fair solubility for water and can bring the water considerably diluted in instantaneous contact with large surface areas of calcium carbide, and do so under controlled conditions, as was developed in the case of the combined recovery of hydrazine and acetylene. Other carrier liquids have been utilized but aniline is a carrier liquid which can be recycled and used over and over again, and it has been eminently satisfactory for the purpose of acelerated and safe acetylene generation in accordance with the general methods described herein. Other liquids have been successfully employed as carriers. Although it is not essential, as pointed out in the case of mineral oil emulsions above, that the carrier liquid possesses solvent power for water it is desirable from a practical point of view to avoid the possibility of the occurence of water pockets which may cause local overheating or other undesirable effects.

Generally speaking, the carrier liquid useable for the purpose can be put in three classes according to their boiling points—low, medium, and high. To give an idea of what is meant by low, medium and high boiling carrier liquids: a "low boiling" liquid would be, for instance, methyl alcohol, or one of the lower amines, while a "medium boiling" liquid would be an alcohol like ethyl-, propyl-, butyl-alcohol or their respective isoformations, as well as some of the amines, i. e. all those which have boiling points between about 50° and 100° C. In the case of "high boiling" carrier liquids, higher alcohols, amines, and amino-alcohols are useful. Typical examples of these are glycols or the ethanolamines.

The lower boiling point carrier liquid offers the advantage that with the help of its refluxing and recycling a constant temperature can be maintained in the reaction chamber without the necessity of outside cooling.

The medium boiling point carrier liquid can be allowed to volatilize in part while the acetylene gas is leaving the reaction vessel. In this manner, the acetylene may be said to be riding on the vapors of the carrier liquid, or vice versa, until the carrier liquid is condensed out ("quenched") and the acetylene travels on alone. The condensate of the medium boiling carrier liquid is then recycled into the reaction chamber. This feature offers the particular advantage that the safety of operations will be greatly increased where it is needed most.

High boiling carrier liquids offer the same advantages as aniline. Although some of their vapor is bound to leave the reaction chamber, increasing proportionately with quantities of acetylene generated and with their velocities, one of the particular advantages of the high boiling carrier liquids lies in the fact that with their help the entire system can be swept clean of acetylene or any other undesirable gases or vapors when the operation comes to a stopping point or shutdown, so that no explosive gas mixtures remain in the system.

There are many other features of the above-described process which make its application desirable and which offer advantages and improvements over the art as applied to the manufacture of acetylene per se. To give two examples: The hopper or the feed for calcium carbide employed in present installations is a constant hazard as it invites explosions if air should accidentally be admitted to the warmer, or hot, portions of the entrance to the generator. In the present process, there is no hopper in the conventional sense as calcium carbide is charged in the form of a slurry consisting of dry calcium carbide and dry inert "carrier liquid." There is no air nor oxygen nor acetylene present where this slurry enters the cycle, and the temperatures of this slurry can be kept as low as is convenient. In other words, the calcium carbide is sufficiently enveloped and protected by a carrier liquid before it enters the system. This is preferably done through an enclosed endless conveyor, or in the case of calcium carbide of smaller particle size the feeding can be accomplished through pumping, or by gravity. The entire system is preferably kept as a closed system so that there is no chance for air to enter or for acetylene to escape accidently through the charging end of the installation.

Another obvious advantage lies in the fact that dry lime can be recovered as a useable by-product, satisfying one of the principal objectives of the present so-called dry generation of acetylene in industry, but at the same time being completely free from the latent hazards inherent in that process.

In the selection and application of the "carrier liquid," discretion must be exercised because some of the materials proposed can be used only for the manufacture of acetylene as they do not fulfill one or more of the requirements stated above for use in conjunction with hydrazine recovery, namely, that they do not react chemically with any other product entering the reaction chamber. Thus, some alcohols react with calcium carbide, or alcohol-amines react with hydrazine, particularly in the presence of acid-forming radicals of weak acids, under certain circumstances and should not be used when the above process is employed also for the recovery of hydrazine.

The present invention is particularly useful in efficiently removing chemically bound water under the conditions described and particularly from such chemical compounds which have a negative heat of formation endothermic or which are only slightly exothermic.

A system that may be utilized in carrying out the invention is shown in the drawing. A reaction chamber 1 having as shown at 2 a bed of calcium carbide or more desirably a slurry of carbide in a carrier liquid, introduced through inlet 3 is reacted with the hydrazine composition entering through pipe 4. Inert gas such as nitrogen is introduced through inlet 5. The gases and vapors including acetylene leave through outlet 6, while the hydrazine and aniline liquid may be withdrawn at 7 lime hydrate being withdrawn at 8. Carrier liquid may return through conduit 9 to chamber 1.

The reaction chamber 1 may include a number of reaction vessels in series or in parallel as required for the particular modification of method chosen. As pointed out above a series of reaction chambers may be used, in which the calcium carbide whether alone or in a carrier liquid is of decreasing particle size, so that the liquid meets the coarsest calcium carbide first. All pumps when used feed through an equalizing tank or sump in which the slurry is thoroughly mixed while trapped gases ($C_2H_2$) are directed to a manifold above the reaction chamber. Where a number of reaction chambers are used such manifold may be used to collect the gases from all of the chambers. Heat exchange and cooling of reaction chambers may be accomplished through outside cooling, or more desirably by means of circulating carrier liquid or slurry, kept at desired temperature levels.

The gases withdrawn through outlet 6 may pass directly to a scrubber but preferably first pass through a drier 10 charged with calcium carbide to react with any residual free or available bound water. There may be one or more of such driers 10 in series or in parallel. From drier 10 the gases pass through conduit 11 to scrubber 12 for carrier liquid such as aniline which may be present. The device is really a heat exchanger and can be operated through outside or inside cooling such as is obtained by circulating refrigerants in pipe lines. Desirably carrier liquid is circulated through the scrubber at low temperatures by pump 13 through line 14 to refrigerator with storage tank 15 and then via line 16 back to the scrubber 12, whereby the carrier liquid is contacted with the gases and vapors from drier 10. When mechanical refrigeration is employed, the gases and vapors enter scrubber 12 from the top. Where the carrier liquid is recirculated, they enter from below. Such alternative operation is indicated in dotted lines. Desirably the pump 13 and refrigerator 15 with storage tank are employed at least in duplicate and operated alternatively. The gases and vapors from scrubber 12 then pass to miscellaneous scrubbers illustrated at 17, 18, 19 which may be operated with or without cooling (refrigeration) to trap hydrazine and carrier liquid vapors. The cooling and scrubbing may be carried out in the same manner as set forth above for scrubber 12 although it may be desirable to operate them at increasingly lower temperatures and with mechanical refrigeration preferred.

From the last scrubber 19, the gases may pass first to a trap 20, then to a sulphuric acid scrubber 21 and finally to acetylene purification and storage 22.

The hydrazine and aniline solution or other composition withdrawn through line 7 from the reaction chamber 1 may enter still 23 to drive off hydrazine vapors through line 24 to a drier 25 containing calcium carbide, similar to drier 10, then to condenser 26 from which the hydrazine may be withdrawn at outlet 27 for storage or other disposal. The aniline bottoms from still 23 may be returned via line 9 to the reaction chamber 1.

Various methods used in carrying out the invention may be illustrated. Thus, calcium carbide in small lumps is placed in a reaction vessel such as a firelite flask filling it to above half size and connected to condensing and receiving apparatus conventionally used in distillation. After replacing the air in the system with an inert gas such as nitrogen, a hydrazine solution containing water in one form or another was fed into the calcium carbide bed by dropping. The reaction was instantaneous producing acetylene, which left the system. Owing to the heat liberated, the calcium carbide bed in the flask began to warm up. As the temperature in the calcium carbide bed increased, a condensate collected in the dome of the reactor. As this condensate increased and part of it flowed back into the calcium carbide bed, hardly any or no reaction whatsoever was noticed between the refluxing liquid and the fresh calcium carbide which it touched. As the temperature increased further and exceeded about 110 to 120° C. while the solution of hydrazine was dropping into the calcium carbide bed at a more or less constant rate, some of the liquid which had condensed in the dome of the reactor began to distill over, and was collected in a suitable receptacle. After all the hydrazine solution (about 1500 parts by volume) had been fed into the calcium carbide bed, a mild amount of external heat was applied and the liquid which did not react with the calcium carbide was driven out of the flask (through a condenser) and collected in the receptacle. Toward the end, a small stream of nitrogen was used to sweep the system. Upon examination, it was determined that the product (about 900 parts by volume) was about 90% hydrazine, the balance water; in other words, a mixture of hydrazine base, $N_2H_4$, and hydrazine hydrate, $N_2H_5OH$.

In addition, a tube charged with calcium carbide lumps was attached to the top of the reaction chamber so that the volatile reaction product had to pass through this tube before it was permitted to enter into the condenser and flow into the receptacle. All the tests which were conducted in this manner showed very clearly that, with the calcium carbide charged tube attached to the flask, a 100% hydrazine was obtained in the receptacle. Furthermore, the recovery of hydrazine increased eventually to the extent of practically 100%, or at least of 98% in individual batches. While in the beginning, yields of 90% were obtained (which is over 10% higher than yields obtainable by conventional industrial methods employing fractional distillation of aqueous solutions), batch operations showed yields of 95% and better. Yields from 98% upward have been obtained in repeated or continuous runs. However, upon adding to the train low temperature condensers (employing refrigerants or even liquid nitrogen as coolants), yields of 100% can easily be obtained. In industrial application there is, of course, greater variety of heat exchange or condensing equipment available, operating at the same time with better efficiency and economy than obtainable under the limitations of ordinary small scale equipment.

According to the arrangement of the equipment and modifications in the procedure of the foregoing method, in other words, depending on the amount and particle size of calcium carbide charged to the reaction chamber, and whether or not another chamber charged with calcium carbide is added through which the vapors must pass before they are condensed, also depending on the velocities with which the reaction products pass through the system, and also depending on the dimensions of the calcium carbide chamber following after the reaction vessel, hydrazine can be produced as desired which is either practically 100% pure or which contains a minor or even an appreciable percentage of hydrazine hydrate, $N_2H_5OH$. It is furthermore possible to arrange conditions in such a way that practically pure hydrazine hydrate, $N_2H_5OH$, will be recovered.

The calcium carbide charged to the reaction chamber is preferably employed in excess, but can be used for several runs before its reactivity slows down. This of course makes it possible to couple hydrazine recovery and acetylene generation in practice. In this manner, hydrazine can be recovered fully from its solution or its compound, while the simultaneously generated acetylene is fed into conventional equipment for treating and storing acetylene. After the calcium carbide bed has served its purpose for hydrazine recovery, it can then still be utilized for the continued but direct generation of acetylene by any of the conventionally employed methods, simply by switching the feed line to water, and the exit pipe to the acetylene treating and storage plant.

In the proper application of this process many combinations are possible and it becomes indicated on the basis of the present status of experience that a continuous system would be more desirable as it could be made nearly automatic and thus become still more economical. In this manner, the carrier liquid charged with controlled amounts of hydrazine solution is first applied to the cycle and brought to reaction with fresh calcium carbide. After the aqueous hydrazine-containing carrier liquid has become exhausted in this process of circulation through $CaC_2$, it is charged repeatedly with said aqueous-hydrazine-solution until the carrier liquid becomes nearly saturated with hydrazine. Then this saturated carrier liquid is withdrawn and the hydrazine recovered. In the meantime, the reactors containing the calcium carbide used in the foregoing steps can preferably be switched over to treatment with carrier liquid which contains only water, though in measured amounts. In this manner two efficient cycles are in simultaneous operation, alternatingly applied to two or more rows or batteries of reactors, and adjusted to efficient team work.

The following examples will illustrate various features of the invention, parts being by weight unless otherwise specified.

I

Calcium carbide was treated with an aqueous solution of hydrazine hydrate containing about 15% water in excess of that in the hydrate (54% $N_2H_4$ hydrazine hydrate aqueous solution) in an atmosphere of nitrogen, using equal parts by weight of solution and carbide.

II

The same method as that of Example I was used but the ratio of reactants was 13 parts of solution to 20 parts of carbide. An 80% yield of 99% hydrazine was obtained.

III

A similar process was carried out using pea size calcium carbide and hydrazine carbonate, $(N_2H_5)_2.CO_3$, containing approximately 52% $N_2H_4$. The ratio of reactants was 10:35 of carbonate to carbide. The carbonate solution was added slowly to the carbide. After the reaction was completed, the temperature in the reaction zone was raised by external heat to boil over the hydrazine, the vapors of which were passed through a calcium carbide drier, into a condenser, where they were condensed and collected.

The hydrazine boiled at 112.2° C., was substantially anhydrous, and analyzed 99.5% N₂H₄.

When the term calcium carbide is used it is intended to include all such carbides which react with water. This group of carbides includes the carbides of the alkali metals and the alkali earth metals particularly magnesium carbide which is very important, particularly for the one of the two Mg-carbides which yield methyl-acetylene, or propyne, $CH_3C{\equiv}CH$, and to some extent the carbides of the rare earth metals. This invention is therefore not limited to the use of calcium carbide alone, nor is it restricted to the generation of acetylene along from such said carbides. As is well known, certain carbides of the groups circumscribed above yield in contact with water, or with aqueous solutions, mixtures of acetylene with other hydrocarbons, such as homologues of acetylene, or other unsaturated hydrocarbons, or even saturated hydrocarbons, such as methane. In such cases in which the methods described herein are used for the generation of hydrocarbons alone, such as acetylene, and not for the simultaneous recovery of hydrazine, the methods described herein are applicable even to the treatment of carbides which do not react with water alone and which require an adjustment of their pH up or down from about pH7.

Hydrides, silicides, and nitrides may also be treated by the methods set forth.

The methods described are equally well applicable to hydrazine derivatives, such as alkyl-hydrazines (e. g. methylhydrazine) or other organic hydrazides or to hydrazonium compounds, as long as their melting point, boiling point, relative stabilities, etc., fall within the range of operating conditions circumscribed in the specification herein.

Hydrazine has a freezing point of about +2° C. Hydrazine-aniline solutions, however, have freezing points which go below —30° C. This fact can be conveniently taken advantage of when the hydrazine vapors (which are always associated with some aniline vapors) are trapped because the temperature can be lowered to such an extent that the vapor pressure of hydrazine or aniline, or of the solution of both, drops to negligible figures and thus permits of full recovery. At the same time, the hydrazine-aniline solution can be maintained in the liquid state, thus it can be prevented from freezing and clogging up the system which could be quite serious at the high gas velocities employed. By the same token, the traps on coolers following those used for hydrazine (and aniline) have been successfully employed at temperatures below the freezing point of acetylene. By choosing the design of this cold trap appropriately, the bulk of the acetylene was frozen out on the inside walls while there remained a sufficient free passage for the excess acetylene to move through the system freely.

A modification like that shown in Figure 2 has been found advantageous when the amount of acetylene generated was greatly in excess of the capacity of the end of the train. In industrial practice, a suitable "deep-freeze" for acetylene is regarded as a decided advantage as it offers more convenient and safer storage than present methods. It has been found that in the generation of acetylene and recovery of $N_2H_4$ the aniline, which goes over the top with the acetylene and is condensed out in the first "deep freeze" at about —10 to 0° C., contains much more sulfur than aniline alone if used in the "washing" of the gases.

Accordingly, one phase of the present invention is concerned with the production of a hydrazine or a hydrazine compound in which a water solution of a hydrazine or a hydrazine compound, or a suspension, dispersion, or emulsion thereof is contacted with a carbide or nitride which reacts with water. The treatment may be carried out under varying conditions of pressure and temperature. Thus in the reaction chamber the pressure may be at about atmospheric or may be above atmospheric but desirably below 10 atmospheres; or the pressure during the distillation of the hydrazine or hydrazine compound such as hydrate may be atmospheric or superatmospheric; or the pressure in the system may be atmospheric or superatmospheric; or the pressure in the system may be atmospheric or super-atmospheric until most of the hydrazine or hydrazine compound has been removed or recovered, and the pressure then reduced to less than atmospheric. Or, pressures below atmospheric may be used when the system is swept with a higher boiling carrier liquid.

The temperatures employed (like the pressure) may vary with materials used, products produced, and conditions of reaction and recovery. The reaction may be carried out at temperatures below room temperature (as by refrigeration) or at room temperature, or at temperatures somewhat above room temperatures, for example moderate temperatures of the order of 50° C.; or at temperatures approximating the boiling point of the hydrazine or hydrazine compound such as hydrate (for example 110 to 120° C.); or at the boiling point of the carrier liquid when the latter is used; or the reaction may be carried out at about room temperature or below, and the temperature subsequently raised to distil out the hydrazine or hydrazine hydrate, or mixtures of hydrazine and hydrazine hydrate, or other hydrazine compound. Or, the reaction may be carried out at the boiling point of a carrier liquid boiling at about 100° C. or below while refluxing the carrier liquid with hydrazine or hydrazine compound, followed by fractional distillation to recover either or both, carrier liquid and hydrazine or hydrazine compound produced.

The water containing hydrazine or hydrazine compound may be a hydrazine or hydrazine compound dissolved in an aqueous medium or solution, or the hydrazine or hydrazine compound may be dissolved in the carrier liquid or added to the carrier liquid in amounts exceeding the solvent capacity of the carrier liquid for such hydrazine or hydrazine compound solutions but uniformly distributed throughout the carrier liquid, or admixed with an inert carrier liquid so that solutions, dispersions, emulsions or suspensions may be used; or the water may be present in dilute solutions, dispersion or suspension within the carrier liquid.

The amount of water present may be varied to produce different results. Thus essentially all of the water present may be consumed by the carbide or analogous reactant. Or enough water may be consumed to form essentially $N_2H_5OH$ (or $N_2H_4.H_2O$), or enough water consumed to form a mixture of hydrazine and hydrazine hydrate. The amount of water present may be controlled from the standpoint of the character of the calcium hydroxide produced. The latter may be in the form of a solid substantially free from water or moisture, or may be in a state of fine division and fluffy.

Various expedients involving the utilization of carrier liquids are available. For example, a water-containing solution of a hydrazine or of a hydrazine compound may be added to an inert carrier liquid in amounts not exceeding the solubility of said water-containing solution in the carrier liquid, and the mixture or solution contacted with calcium carbide until all contained water, free as well as bound, has been consumed by the carbide, and a hydrazine substantially free from water, moisture, or bound water, produced in the carrier liquid, and the hydrazine removed from the carrier liquid by fractional distillation. The water-containing hydrazine or hydrazine compound may be contacted with the solid calcium carbide until the desired amount of free or bound water has been consumed, simultaneously forming essentially acetylene gas and solid calcium hydroxide, the gas and solid separated from the liquid, and the hydrazine separated from the liquid, for example by distillation or precipitation.

The gases formed in the reaction may be treated in a number of ways. The acetylene formed may be carried out of the chamber by or with other gases or vapors originating from the reaction or from the carrier liquid. Desirably the acetylene gas is always associated with vapor or gases other than acetylene as long as it is exposed to temperatures above room temperature, especially above about 100° C.

The gases and vapors escaping from or leaving the reaction chamber may for example be subjected to contact with dry calcium carbide to consume all, or a part, of residual, free or combined, water present; or such vapors or gases may be passed through scrubbers in which amines remove impurities therefrom increasing the relative percentage of the desired reaction products present; or combinations of these methods may be employed. A multiplicity of scrubbers may be used employing one or several of these methods or of various scrubbing operations. The gases or vapors leaving the reaction chamber may be deprived of essentially of all constituents as desired, through scrubbing or condensation, leaving essentially pure acetylene as the sole gas passing out of the system.

In the scrubbers, the amines employed may be liquid and the gases and vapors bubbled therethrough, or countercurrent contact may be used, or the amine sprayed as a mist into the scrubbers while the gases and vapors from the reaction chamber pass through the scrubber. The amines employed may be solvents for hydrogen sulfide, phosphines, and other objectionable impurities commonly resulting from calcium carbide reactions and present in the scrubbers in gaseous or vapor form. The amine used in the scrubber may be the same as or different from that used as carrier liquid in the reaction chamber. The amine may be a solvent for hydrazine and/or for hydrazine hydrate, or may form solutions with hydrazine which solutions possess freezing points below those of the constituents present, or the aminehydrazine composition may form solutions with impurities which solutions possess freezing points lower than those of the amine-hydrazine composition per se. The amine may for example be aniline.

Hydrazine vapor leaving the reaction chamber may be condensed to a liquid or to a solid, or may be condensed into another liquid. The acetylene gas produced may be refrigerated, condensed to a solid, passed through conventional purification equipment and stored in gas chambers, or dissolved in acetone, or filled into cylinders, or otherwise treated.

The separated solids may be treated with carrier liquid containing controlled amounts of water followed by separating the liquid from the solids and utilizing the liquid for admixture of a water-containing hydrazine or hydrazine compound. Solids may be separated from liquids by filtration or by centrifuging, or subjected to pressure to remove excess liquid, or treated with a solvent to remove excess liquid, or the solids may be heated for example in vacuo or under reduced pressure to remove liquids therefrom. Recovered solids such as calcium hydroxide may be employed in the manufacture of calcium carbide.

In a second phase of the invention, particular emphasis may be laid on the production of acetylene as by adding water to an inert carrier liquid and contacting the resulting mixture or solution with calcium carbide. Expedients employed in the production of hydrazine as set forth above will also apply here. The water may be soluble in the carrier liquid as in a state of dilute solution, or may form an emulsion with the carrier. The amount of water in the carrier liquid, the velocity of the stream moving through the reaction chamber and the temperature may be so regulated that the maximum of acetylene is generated per time unit from calcium carbide ingots, lumps, or particles. The maximum generation possible per time unit is achieved through agitation of the calcium carbide in sizes smaller than lumps. The calcium carbide may be in the form of ingots or large lumps, preferably in ingots of cylindrical shape. The water containing carrier liquid may be contacted with calcium carbide of decreasing particle size. The carrier liquid may be recycled and its water content regulated and replenished to predetermined percentages. The calcium carbide may be admixed with carrier liquid and introduced into the reaction chamber. A slurry of carrier liquid may be maintained in motion and water added thereto under controlled conditions, either with or without agitation or with or without recycling, or any combination of these expedients. The temperature in the reaction zone may desirably be held at temperatures not exceeding room temperatures and preferably much below.

Any of the methods herein set forth may be operated intermittently or continuously.

Having thus set forth my invention, I claim:

1. The method of producing a hydrazine from a hydrazine containing water composition which comprises contacting said composition with calcium carbide in an amount to react with the water present, to give a hydrazine in the form and concentration desired, the calcium carbide being carried in an organic carrier liquid inert at the temperatures employed to the desired products.

2. A method as in claim 1 in which the inert liquid is a solvent for the hydrazine derivative produced.

3. A method as in claim 1 in which the inert liquid is aniline.

4. A method as in claim 1 in which the carrier liquid removes impurities including hydrogen sulfide and phosphines by reaction therewith.

5. A method as in claim 4 in which the carrier liquid is an amine.

6. A method as in claim 4 in which the temperature in the reaction zone is below room temperature.

7. A method as in claim 1 in which the reaction is carried out at a temperature at which said carrier liquid volatilizes in part and the vapors removed with the acetylene formed, condensing the vapors of the carrier liquid, and recycling the condensate to the reaction zone.

8. A method as in claim 1 in which the temperature at one stage of the reaction is such as to volatilize the carrier liquid in part to sweep the system clean of acetylene and to prevent the formation of explosive mixtures.

9. A method of producing hydrazine from a water-containing composition of hydrazine which comprises introducing said composition into a reaction zone containing calcium carbide in an amount to react with all water present both free and combined to produce acetylene and to remove water from the aqueous composition as desired to produce substantially anhydrous hydrazine in said zone, the calcium carbide being carried in an organic carrier liquid inert at the temperature employed to the desired products, removing the acetylene generated, raising the temperature in said zone to distill hydrazine therefrom, and recovering substantially anhydrous hydrazine therefrom.

10. A method as in claim 9 in which the inert liquid is aniline.

11. A method of producing hydrazine from a water-containing composition of hydrazine which comprises introducing said composition into a reaction zone containing calcium carbide in an amount to react with the water present to produce acetylene and to remove water from the aqueous composition as desired, in which an inert liquid slurry with the calcium carbide is used, removing the acetylene generated, raising the temperature in said zone to distill hydrazine therefrom, and recovering said hydrazine.

12. A method as in claim 11 in which the inert liquid is aniline.

13. A method of producing hydrazine and acetylene utilizing an aqueous composition of hydrazine which comprises contacting at a temperature below the boiling point of hydrazine said aqueous composition successively in separate zones with calcium carbide of decreasing particle size, segregated by particle size in said separate zones, in which the calcium carbide is present as a slurry in an organic carrier liquid inert at the temperature employed to the desired products.

14. A method as in claim 13 in which the inert liquid is aniline.

15. A method of producing acetylene which comprises contacting water with calcium carbide in separate zones of decreasing particle size in said separate zones, in the presence of a non-aqueous carrier liquid for at least one of the reactants, the calcium carbide being present as a slurry in an organic carrier liquid inert at the temperature employed to the desired products.

16. A method as in claim 15 in which the inert liquid is aniline.

17. The method of producing hydrazine and acetylene which comprises circulating an organic carrier liquid inert at the temperature employed to reactants and products formed, through a slurry forming zone in which a slurry of calcium carbide with carrier liquid is produced, transferring the slurry to a reaction zone into contact at a temperature below the boiling point of hydrazine with an aqueous composition containing hydrazine to react water therein with the carbide in amount to give hydrazine in the form and concentration desired, and acetylene, withdrawing a composition containing hydrazine and carrier from the reaction zone, passing said hydrazine-carrier composition through a separating zone to separate hydrazine and carrier, and returning the carrier to the slurry forming zone.

18. A method as in claim 17 in which the inert liquid is aniline.

References Cited in the file of this patent

UNITED STATES PATENTS

| 82,309 | Hageman | Sept. 22, 1869 |
|---|---|---|
| 422,334 | Curtius | Feb. 25, 1890 |
| 556,115 | Turney | Mar. 10, 1896 |
| 648,688 | Green | May 1, 1900 |
| 910,858 | Raschig | Jan. 26, 1909 |
| 1,265,573 | Wolf | May 7, 1918 |
| 1,480,166 | Joyner | Jan. 8, 1924 |
| 1,916,592 | Weibezahn et al. | July 4, 1933 |
| 1,959,503 | Seuffert et al. | May 22, 1934 |
| 1,971,847 | Baume et al. | Aug. 28, 1934 |
| 2,122,889 | Mues | July 5, 1938 |
| 2,537,791 | Schwarcz | Jan. 9, 1951 |

FOREIGN PATENTS

| 444,883 | France | Aug. 20, 1912 |
|---|---|---|
| 907,292 | France | June 18, 1945 |

OTHER REFERENCES

Deming: General Chemistry, 5th ed., page 368, (1944), pub. by John Wiley and Sons, N. Y.

Audrieth: The Chemistry of Hydrazine, pages 45–51 (January 1951), pub. by John Wiley & Sons, N. Y.

Hofmann et al.: Berichte der Deutschen Chemischen Gesellschaft, vol. 57, pages 945–953 (1924).

Audrieth et al.: Chemical and Engineering News, vol. 26, No. 50, pp. 3746–3749 (December 13, 1948).